(12) United States Patent
Yetzke

(10) Patent No.: US 7,686,148 B2
(45) Date of Patent: Mar. 30, 2010

(54) CLUTCH COMPONENT

(76) Inventor: Steven Yetzke, 1959 N. Main St., Orange, CA (US) 92865

( * ) Notice: Subject to any disclaimer, the term of this patent is extended or adjusted under 35 U.S.C. 154(b) by 478 days.

(21) Appl. No.: 11/538,029

(22) Filed: Oct. 2, 2006

(65) Prior Publication Data

US 2008/0078643 A1    Apr. 3, 2008

(51) Int. Cl.
F16D 19/00 (2006.01)
F16D 11/06 (2006.01)
F16D 13/00 (2006.01)

(52) U.S. Cl. .................. 192/83; 192/70.28; 192/89.23
(58) Field of Classification Search .............. 192/70.27, 192/70.28, 83, 89.22, 89.23, 105 B, 105 BA, 192/110 R
See application file for complete search history.

(56) References Cited

U.S. PATENT DOCUMENTS

| 2,203,117 | A * | 6/1940 | Whatmough | 192/105 B |
| 3,265,172 | A * | 8/1966 | Atsumi et al. | 192/55.6 |
| 6,910,563 | B2 * | 6/2005 | Maimone | 192/83 |
| 6,957,730 | B1 * | 10/2005 | Youngwerth | 192/83 |
| 2005/0121284 | A1 * | 6/2005 | Abusamra et al. | 192/105 B |

* cited by examiner

Primary Examiner—Roger Pang
(74) Attorney, Agent, or Firm—Bruce A. Jagger

(57) ABSTRACT

A clutch spring kit that is particularly suited to replacing a standard motorcycle pressure plate in a diaphragm spring biased clutch assembly. The clutch assembly is activated by centrifugal force acting on spherical deflection elements. A plurality of pocket elements are generally arranged in an annular array formed in the spring side of a clutch pressure plate. The pocket elements are generally disposed radially inwardly of and adjacent to an upstanding lip element on the first side of the pressure plate. The pocket elements include ramps that extend within the pocket elements generally outwardly toward the lip element and angularly upwardly towards the spring side. A spherical deflection element, such as a ball bearing, is received in each of the pocket elements for generally radial movement along the ramp. A diaphragm spring, the periphery of which is confined by the lip element, is in spring biasing association with the first side of the pressure plate. The spherical deflection elements engage the diaphragm spring and deflect its periphery axially outwardly as the spherical deflection elements move axially upwardly and radially outwardly along the ramps under the urging of centrifugal force.

13 Claims, 4 Drawing Sheets

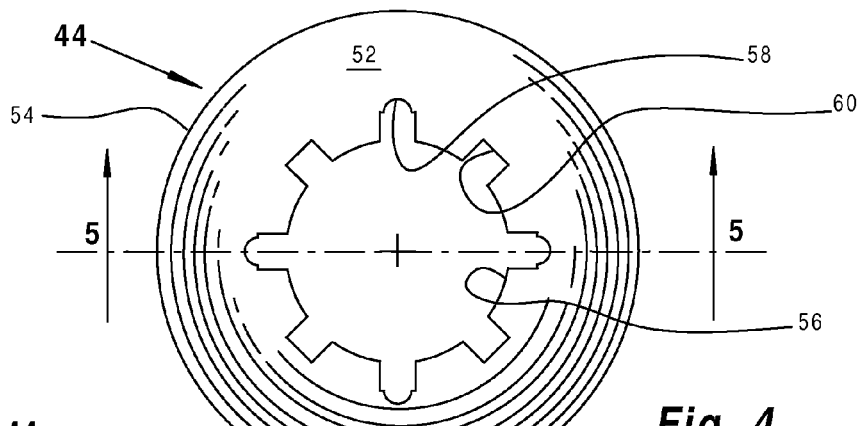
*Fig. 4*
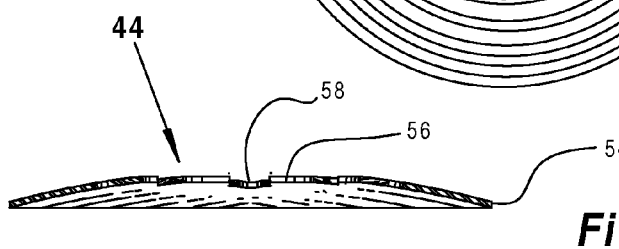
*Fig. 5*
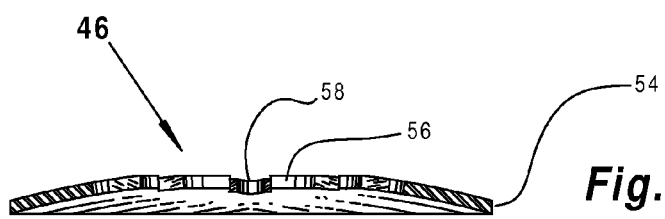
*Fig. 6*
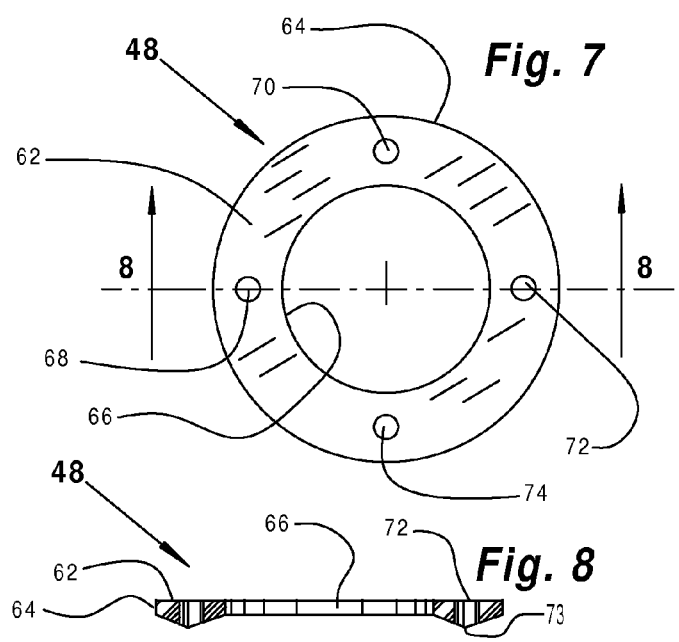
*Fig. 7*
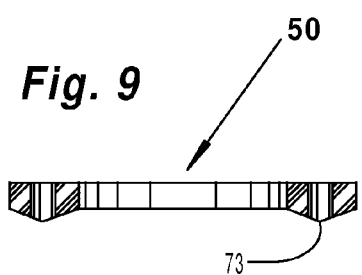
*Fig. 9*
*Fig. 8*

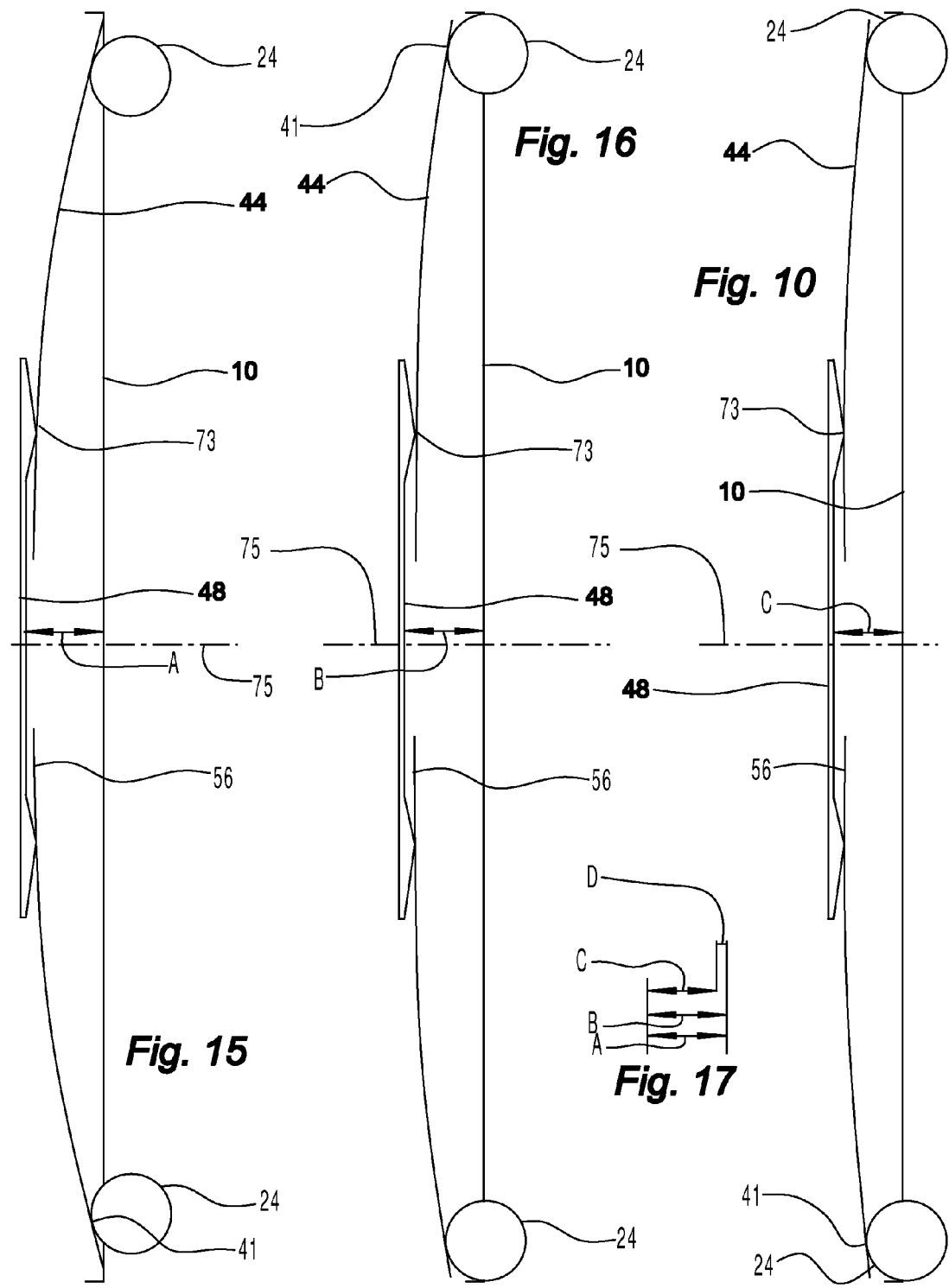

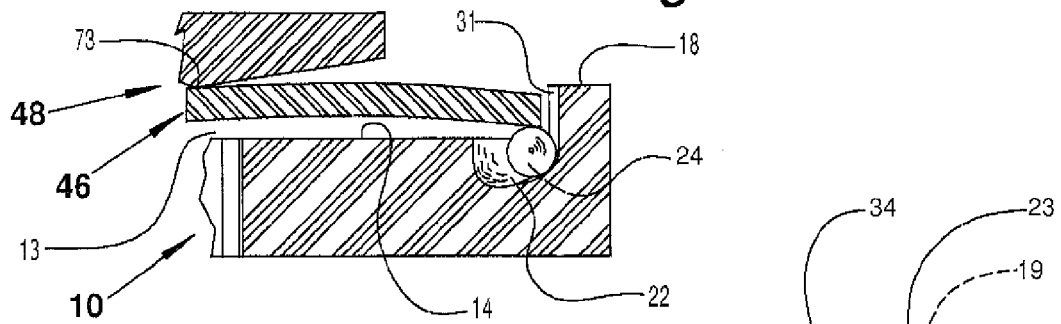
*Fig. 11*
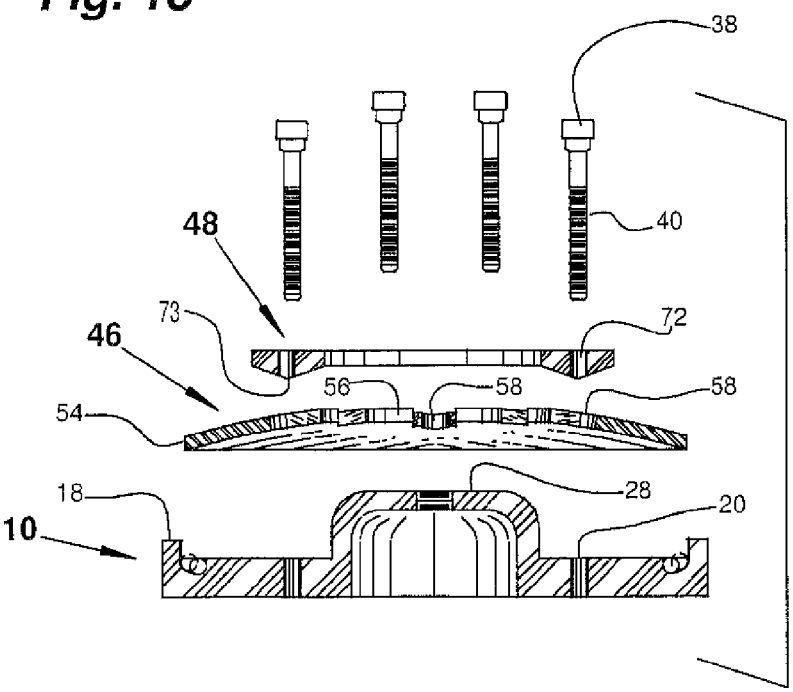
*Fig. 13*
*Fig. 18*
*Fig. 12*

CLUTCH COMPONENT

FIELD OF THE INVENTION

The present invention relates generally to clutch augmentation systems, and more particularly to kits with improved pressure plate assemblies.

BACKGROUND

Mechanical clutches are widely used in power transmissions systems between motors or engines and transmissions or other applications. Air, land, and sea vehicles, agricultural and grounds maintenance implements, construction equipment, stationary systems, and the like, all require the use of some type of clutch to disengage the engine from the application. Certain clutches, and particularly conventional motorcycle clutches, comprise a stack of friction discs and steel plates sandwiched between a generally axially fixed clutch hub and an axially moveable pressure plate. In the engaged position the friction disks and steel plates are forced together and rotate together so that power is transmitted through the clutch. In the disengaged position the disks and plates are slightly separated and do not rotate together, so power is not transmitted through the clutch.

Prior proposals for augmenting automobile and truck clutches have included various centrifugally activated members. In general such members were complicated, included several moving parts, and were expensive to make. When they malfunctioned they were generally expensive to repair. In general, motorcycle clutches had not been augmented with centrifugally activated members.

Many motorcycle clutches are of a design wherein a diaphragm spring is used to bias a pressure plate towards an engaged configuration. In general, in such designs the pressure plate moves axially relative to the diaphragm spring between engaged and disengaged configurations. The pressure plate is held in an engaged configuration by the biasing force of the diaphragm spring. Disengagement of the clutch occurs when the pressure plate is moved axially relative to the diaphragm spring in a direction against the spring bias. Where disengagement is intended to be accomplished manually, there are practical limits as to the amount of force the diaphragm spring can apply. If it requires too much force to disengage the clutch, people will not be able to operate it. There was a long felt need in the art for manually actuated diaphragm biased clutches that could exert more force than would normally be possible in a manually actuated clutch.

Previous conventional pressure plates provided a fixed amount of pressure to the clutch disks. The fixed amount of pressure was generally determined by the thickness and other characteristics of the diaphragm spring. Previously, the amount of such pressure was limited to ensure the clutch could be manually operated, and, also to allow the clutch to slip if excessive force was sent through the driveline. An unintended consequence of so limiting the amount of pressure on the clutch was that at high speeds when significant power needed to be sent through the driveline, there was undesirable slippage.

The nature of the spring that serves to bias the pressure plate determines the "feel" or behavior of the clutch during engagement and disengagement. A diaphragm spring (sometimes described as a bellville or disk spring) resists disengaging the pressure plate until the spring substantially flattens, at which point the spring force diminishes abruptly and substantially, so that little force is required to hold the clutch in the fully disengaged configuration. Diaphragm spring biased pressure plate systems tend to go very quickly from full disengagement to full engagement with little slippage.

When a clutch is required to function between a high horsepower motor (for example, over 80 horsepower) and a transmission, the clutch controls may require some augmentation. This is because the force of the required spring bias may become so great that the clutch can not be operated manually without hydraulic or other assistance. Such augmented control systems come at substantial cost in complexity, reliability, maintenance and initial price. There was a long felt need in the art for diaphragm spring biased clutches that could function with a high horsepower engine, and still be manually operated.

There are many motorcycle clutches of the diaphragm spring type in use now that were manufactured in years past. The performance of such clutches has been less than desired by their owners. There is a recognized need in the art for kits that would allow the conversion of such existing clutches to a more satisfactory configuration without excessive complexity, expense, or special tools.

Accordingly, it is an object of the invention to provide a kit for automatically augmenting the engagement pressure on the clutch of a vehicle, particularly a motorcycle, based upon engine speed.

SUMMARY OF THE INVENTION

The present invention has been developed in response to the current state of the art, and in particular, in response to these and other problems and needs, which have not been fully or completely solved by currently available clutches. Thus, it is an overall object of the present invention to effectively resolve at least the problems and shortcomings identified herein. In particular, it is an object of the present invention to provide a clutch that enjoys an augmented spring pressure responsive to increased revolutions per minute (RPM). It is a further object of the present invention to provide a clutch augmentation kit that includes all of the components required to modify a conventional diaphragm spring biased pressure plate clutch. Embodiments of the present invention are particularly suitable for use in motorcycles, other land sea and air vehicles, agricultural and maintenance implements, stationary applications, and the like.

An embodiment of the present invention includes an improved clutch member in the nature of a pressure plate assembly. This assembly comprising a substantially circular element having a perimeter, a substantially circular biasing element having a periphery, and a plurality of deflecting elements that have substantially circular cross-sections. The deflecting elements are mounted for generally radial movement relative to the longitudinal axis of the substantially circular element. The substantially circular element includes generally opposed parallel first and second sides spaced apart by a thickness. The first side includes a generally axially extending perimeter dimensioned to retainingly accommodate the periphery of the substantially circular biasing element. The first side also includes several recessed regions or pockets. These second recessed regions are generally radially and symmetrically arrayed approximately adjacent to the perimeter. Each of these recessed regions is of sufficient width and depth to accommodate at least approximately half of one of the deflecting elements. Each of the recessed regions has a varying depth into the thickness of the substantially circular element. The depth is reduced at a generally uniform rate with increasing proximity to the perimeter of the substantially circular element. The substantially circular biasing element is made of a resilient material (for example, spring steel or the like), which is capable of being elastically deformed in a direction substantially perpendicular to the plane of the periphery. Each of the deflecting elements is at least partially accommodated in one of the plurality of recessed regions or pockets. The periphery of the substantially circular biasing element is deflected away from the circular element by the plurality of deflecting elements when such deflecting elements move toward the perimeter of the first substantially circular element.

In another embodiment of the present invention, the improved clutch assembly includes a substantially circular disk member adapted to be mounted for rotation about a longitudinal axis. The substantially circular disk member includes first and second sides and has a finite thickness. The first side is generally radially bounded by a lip element that extends approximately peripherally of the first side. Several pocket elements are formed into the first side. The lip element is dimensioned to restrainingly accommodate the periphery of a substantially circular biasing element, and the pocket elements are configured to accept a plurality of deflection elements for generally radial movement therein. The deflection elements are carried by the substantially circular disk member as it rotates so they are subjected to centrifugal force. The deflection elements are preferably generally spherical.

The plurality of pocket elements extend into the thickness of the substantially circular disk member from the first side. The pocket elements are radially and symmetrically arranged around approximately the perimeter of the first side generally radially inwardly of the lip element. Preferably, the pocket elements extend radially outwardly at least to but not through the lip element. The pocket elements generally include a ramp which is angled generally radially outwardly and preferably axially upwardly toward the lip element. The pocket elements are wide enough to receive the deflection elements, and preferably allow them to rollingly move on the ramp between a radially inward axially lower first position and a radially outward axially higher second position. In the second position the deflection elements generally project out of the first face of the substantially circular disk member for a distance equal to from approximately one quarter to three quarters of the diameter of the deflection elements. Preferably, the deflection elements are constrained from moving radially beyond the second position by at least the lip element. With certain configurations of the substantially circular biasing element the ramp may not need to be angled axially upwardly. The configuration in such embodiments is such that the radially outward movement of the deflection elements alone deflects the periphery sufficiently to accomplish the desired deflection of the periphery. In such configurations the ramp is often longer than approximately one-half of the length of the diameter of the deflection element, for example, from approximately one-half to five times or more the length of the diameter of the deflection element.

The substantially circular biasing element is comprised of a resilient material, which is capable of being elastically deformed in an axial direction that is substantially perpendicular to the plane of its periphery. The substantially circular biasing element is generally radially confined by the lip element. The deflection elements serve to deflectingly engage the substantially circular biasing element near its periphery and to deflect that periphery axially upwardly away from the second side of the substantially circular disk member as the deflection elements move between the first and second positions in the pocket elements.

In another embodiment, the first side of the substantially circular disk member is generally planar. In another embodiment the disk member may be made, for example, of an aluminum alloy, or the like, the deflection elements are, for example, steel spheres or steel rollers, or the like, and the pocket elements are provided with a hard anodized coating, or the like. The substantially circular biasing element may, for example, be made of spring steel or the like and may take the form of a diaphragm spring or the like.

Another embodiment of the present invention includes a clutch augmentation kit. The kit generally comprising at least a specially configured pressure plate member adapted for rotation generally about a longitudinal axis in a plane, and a plurality of generally spherical deflection elements. The pressure plate member includes generally opposed spring and clutch sides, and a peripheral flange element. The spring side is generally adapted to being mounted axially outward of the clutch side. The peripheral flange element is adapted to radially confining at least one diaphragm spring member on the spring side. A plurality of pocket elements, generally arranged in an annular symmetrical array, are formed in the pressure plate member and generally disposed adjacent the peripheral flange element. The pocket elements open on the spring side and include ramp portions. The ramp portions extend within the pocket elements generally radially outward toward the peripheral flange element and angularly axially outward towards the spring side. A plurality of generally spherical elements are adapted to being received in the pocket elements for movement along the ramp portions between a radially inner axially lower first position and a radially outer axially outward second position. Radially outward motion being caused by centrifugal force, and radially inward motion being caused by the spring biasing force of the spring. The kit may also include at least a diaphragm spring member that has a periphery and is adapted to being radially confined by the peripheral flange element in spring biasing association with the pressure plate member. The diaphragm spring member is adapted to resiliently bias the pressure plate member generally in the inward axial direction that the clutch side faces. The spherical elements are adapted to deflectingly engage the diaphragm spring member adjacent its periphery, and to deflect the diaphragm spring member axially outwardly as the spherical elements move axially and radially outwardly along the ramp portions. When the spherical elements are deflectingly engaged with the diaphragm spring member, the force of the spring is applied to the pressure plate member through the spherical elements. The diaphragm spring member is not in contact with the pressure plate member.

BRIEF DESCRIPTION OF THE DRAWINGS

FIG. 4. is a top view of a diaphragm spring member in the form of a biasing member;

FIG. 5. is a cross-sectional view taken along line 5-5 in FIG. 4;

FIG. 6. is a cross-sectional view similar to FIG. 5 of an alternative embodiment;

FIG. 7. is a top view of the spring retainer element;

FIG. 8. is a cross-sectional view taken along line 8-8 in FIG. 7;

FIG. 9. is a cross-sectional view similar to FIG. 8 of an alternative embodiment;

FIGS. 10, 15, and 16, are diagrammatic cross-sectional views showing the interrelationship between the spring retainer element, diaphragm spring member, deflecting elements, and pressure plate member at various phases in the operation of this embodiment;

FIG. 17 is a comparative diagrammatic representation of the distance between the spring retainer element and the first side of the pressure plate member at different phases of the operation of the clutch as illustrated in FIGS. 10, 15, and 16.

FIGS. 11 and 13 are fragmentary diagrammatic cross-sectional views of an assembly of the spring retainer element, diaphragm spring element, spherical deflecting elements, and pressure plate member at different stages during the operation of this embodiment, particularly illustrating the deflection of the diaphragm spring element relative to the other components of the assembly;

FIG. 12 is an exploded cross-sectional view of an assembly of a spring retainer element, a diaphragm spring element, spherical deflecting elements, a pressure plate member, and a plurality of fastening elements;

FIG. 18 is a diagrammatic, fragmentary, and magnified top view of a generally radially extending pocket element in the pressure plate member with a cylindrical deflecting element illustrated at both ends of its radial limits of travel within the pocket element.

DETAILED DESCRIPTION

Figure 1:
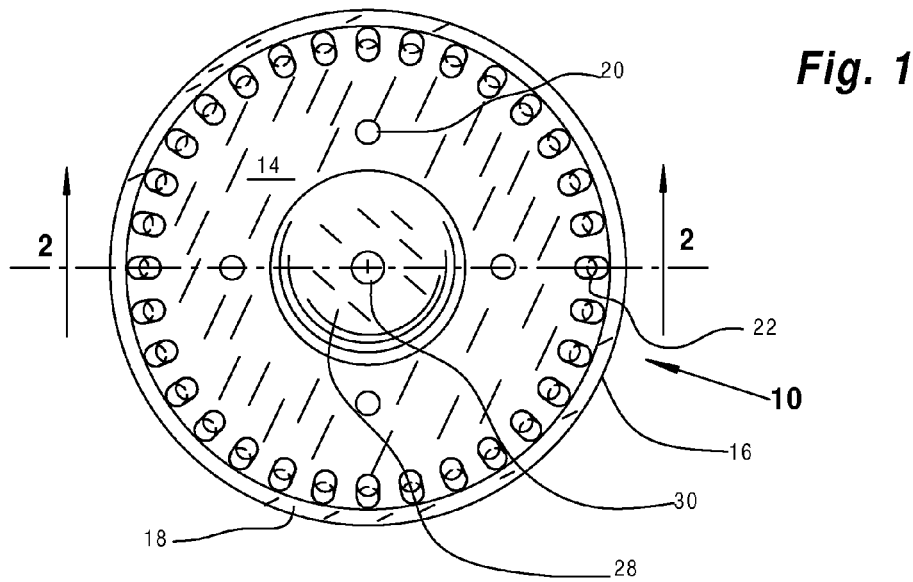
FIG. 1. is a top view of a pressure plate member in the form of a substantially circular disk member or element.
Figure 2:
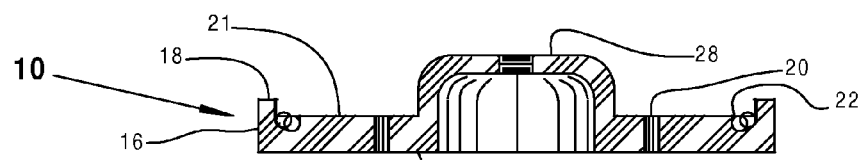
FIG. 2. is a cross-sectional view of the pressure plate member of FIG. 1 taken along line 2-2 in FIG. 1.
Figure 3:
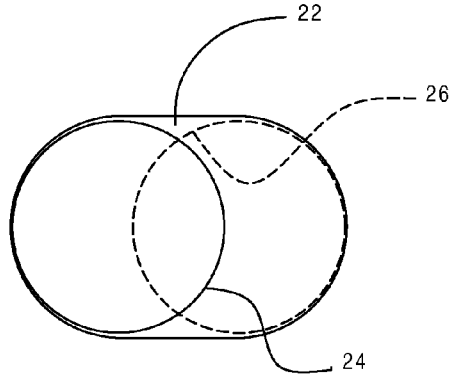
FIG. 3. is a diagrammatic, fragmentary, and magnified top view of a generally radially extending pocket element in the pressure plate member with a spherical deflecting element illustrated at both ends of its radial limits of travel within the pocket.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention. The description of the preferred embodiments has been presented for purposes of illustration and description, but is not intended to be exhaustive or limited to the invention in the form disclosed. Many modifications and variations will be apparent to those of ordinary skill in the art. For example, a variety of other materials, and dimensions could be utilized without departing from the spirit of the above-described embodiments. The embodiments presented herein are presented in order to best explain the principles of the invention and its practical application, and to enable others of ordinary skill in the art to understand various embodiments and various modifications suited to a particular use.

One embodiment of the present invention includes an improved clutch assembly. This assembly is envisioned to have primary application in the motorcycle arts but may be equally used with any system employing a clutch system. The present invention is especially useful for clutching association with motors that are capable of operating at high RPMs (for example, 5,000 to 8,000 RPM) and will find application a variety of settings including higher performance motorcycles.

With particular reference to the drawings appended hereto, there is illustrated generally at 10 a pressure plate member in the form of a substantially circular element 14 having a radially outer perimeter 16. A lip element in the form of a peripheral flange 18 projects generally axially from first side 21 of pressure plate member 10 at approximately outer perimeter 16. The first side 21 of pressure plate member 10 also includes several second recessed regions or pocket elements 22 formed in pressure plate member 10, and generally radially arrayed adjacent lip element 18. First side 21 is generally positioned facing axially outwardly. A second side 12 of pressure plate member 10 is generally opposed to first side 21 and is positioned facing generally axially inwardly. First side 21 is generally located on the spring side of the pressure plate member 10, while second side 12 is located on the clutch side of pressure plate member 10.

A diaphragm spring member is indicated generally at 44. Diaphragm spring member 44 is in the form of a substantially circular biasing element 52, and it has a radially outer periphery 54. Diaphragm spring member 44 is adapted to being located on first side 21, and serves to axially spring bias the pressure plate member 10 towards a clutch engaged configuration. Lip element 18 on first side 21 is dimensioned to restrainingly accommodate radially outer periphery 54. Lip element 18 generally projects axially outwardly of first side 21 for a length that is sufficient to at least confine diaphragm spring member 44 from substantial radial movement out of axially aligned engagement with pressure plate member 10. The substantially circular biasing element 52 is made of a resilient material (for example, spring steel), which is capable of being elastically deformed in a direction substantially perpendicular to the plane of the periphery 54.

A plurality of deflection elements 24 have substantially circular cross-sections and are adapted to be mounted radially inwardly of and adjacent to radially outer periphery 54 in deflecting relationship thereto. Pocket elements 22 are adapted to captively retain deflection elements 24 in resiliently deflecting relationship to diaphragm spring member 44. Deflection elements 24 are adapted to being radially moveably received in pocket elements 22 for movement along ramp portions 27. Pocket elements 22 are radially arrayed generally adjacent to the lip element 18. Each of pocket elements 22 is of sufficient width and depth to receive and confine one of the deflection elements 24. The pocket elements 22 are substantially identical to one another and they are placed at substantially the same radial location generally adjacent lip element 18. Each of pocket elements 22 has a ramp portion 27 at the bottom thereof. Ramp portions 27 are inclined at an angle to the plane in which pressure plate member 10 is adapted to rotate as indicated at 29. As deflection elements 24 move radially outwardly within pocket elements 22, ramp portions 27 guide them axially outwardly. The depth of the ramp portions 27 is reduced with increasing proximity to the lip element 18. Ramp portions 27 may extend axially and radially outwardly in a straight or arcuate line, as may be desired. The straight line form provides a more uniform rate of spring tension increase or decrease.

Figure 14:
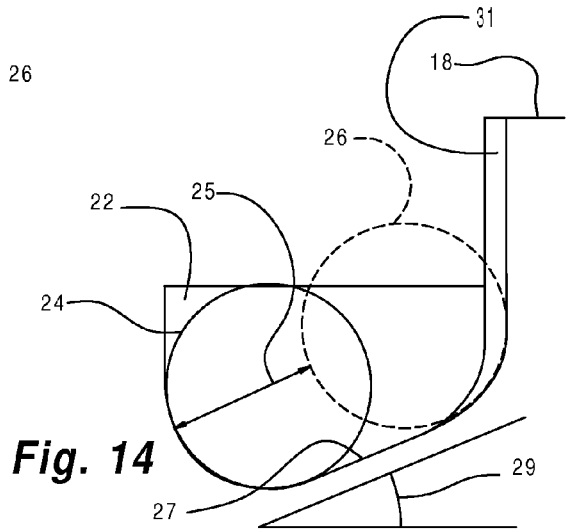
FIG. 14 is a diagrammatic, fragmentary, and magnified cross-sectional side view of a pocket element in the pressure plate member, also showing a spherical deflecting element's range of motion within the pocket.

The pressure plate member 10 rotates during use about axis of rotation 75. This rotation generates centrifugal force. The deflection elements 24 are urged radially outwardly along ramp portions 27 by this centrifugal force. As the deflection elements 24 climb up the ramp portions 27 they bear against the diaphragm spring member 44 generally adjacent the periphery 54, and deflect it in an axially outward direction away from first side 21. This deflection is accommodated by the flexure of diaphragm spring member 44. Compare, for example, the deflection of diaphragm spring member 44 as shown in FIGS. 15 and 16. In FIG. 15 deflection element 24 is shown at the radially and axially innermost location on ramp 27. In FIG. 16 deflection element 24 is shown at the radially and axially outermost location on ramp 27. The detail of these two positions for deflection element 24 is shown, for example, in FIG. 14, where the radially and axially outermost position is indicated at 26. The axially innermost position of deflection element 24 as shown in FIG. 14 corresponds to FIG. 15, and the axially outermost position of deflection element 26 as shown in FIG. 14 corresponds to FIG. 16. The maximum distance that deflection element 24 travels along ramp portion 27 is indicated at 25 in FIG. 14. Preferably, pocket elements 22 terminate in grooves 31 (See, for example, FIGS. 11, 13, and 14). Grooves 31 extend generally parallel to the longitudinal axis 75 (See, for example, FIGS. 10, 15 and 16) of the clutch assembly and its components. Axis 75 is the axis of rotation of the clutch assembly. Grooves 31 are formed in the axially extending radially inner wall of lip element 18 at the radially outer end of pocket elements 22. When present, grooves 31 tend to prevent deflection elements 26 from escaping from the pocket elements 22 when they are at the radially outermost limit of travel.

The displacement 25 may be more or less than one diameter of the deflection element 24. In all embodiments, the ramp 27 has a length that is oriented generally radially to permit generally radial movement of the deflection element 24. The length may be varied depending on the embodiment. In one embodiment the length may be less than twice the diameter of the deflection element 24, although lengths of from approximately one-eighth to as much as five times or more of the diameter may be employed. Typically, the length shown in FIG. 14 is less than the diameter of deflection element 24, and in an embodiment is from approximately one-quarter to three-quarters the length of the diameter. The length of travel or displacement 25 may be varied based on design considerations, however, usually the ramp 27 will be designed to accommodate a deflection element 24 at or below first side 21 when in a radially inward first position and above first side 21 when in a radially outward second position 26.

The angle 29 of the ramp portions can be widely varied. In an embodiment, it is between about 28 and 36 degrees. Specific embodiments using approximately 28 degrees, 29 degrees, 30 degrees, 31 degrees, 32 degrees, and 33 degrees are also specifically contemplated. However, angles of as little as approximately 0 or as much as approximately 60 degrees are contemplated. More commonly, angles between 20 or 25 to 50 or 55 degrees are contemplated. Steeper angles above approximately 30 degrees often will be used with assemblies that are designed to operate at higher RPMs for example, above approximately 5,000 RPM. The deflection elements 24 are contemplated to be displaced as indicated at 25 radially toward perimeter 16 by the action of centrifugal force as created by the spinning of the pressure plate member 10 about axis 75.

The deflection elements 24 (which in the embodiment chosen for illustration are generally spherical) are contemplated to be displaced by an amount 25, which is sufficient to deflect the diaphragm spring member 44 to the point where it is exerting approximately its maximum design spring tension on the deflection elements 24, and through them to the pressure plate member 10. In another embodiment, the system is used in a motorcycle and the spring deflection resulting from the radially outwardly displacement of deflection elements 24 serves to augment clutch performance by increasing the spring force applied to the pressure plate member 10.

A clutch assembly is generally held together with bolts, machine screws, or other removable fasteners that extend generally axially through the assembly. A plurality of apertures or bores 20 may be provided in pressure plate member 10 for the purpose of receiving such fasteners. The apertures 20 penetrate axially through the pressure plate member 10 in a direction substantially perpendicular to the plane in which the pressure plate member 10 rotates. The apertures 20 are contemplated to be equilaterally spaced, and radially set back from the lip 18.

Diaphragm spring member 44, in the embodiment chosen for illustration, is in the form of a generally axially inwardly facing concave annulus wherein a central passageway extends axially through member 44. The rim of this central passageway is broken by a plurality of teeth. Such teeth, of which 56 is typical, are generally spaced approximately evenly around the inner periphery or rim of member 44. Teeth 56 are generally defined by adjacent radially extending openings, of which 58 and 60 are typical. Openings 58 are shaped at their radially outer ends to permit fastener elements, of which 38 is typical, to pass therethrough. Fastener element 38 are typically threaded as illustrated at 40. The diaphragm spring member 44 is concave on the clutch side and convex toward the axially opposed side.

The diaphragm spring members can be of different thicknesses or stacked two or more together depending on the requirements of the system. For example, FIG. 5 shows a thinner, and, therefore, lighter spring force diaphragm spring member 44, while FIG. 6 shows a thicker, and, therefore, heavier spring force diaphragm spring member 46. Members 44 and 46 are substantially the same in planform, but they are of different thicknesses, and provide different spring characteristics. Hereinafter it should be understood that reference to the heavier or lighter diaphragm spring member should not be read to exclude the utility of either spring, and description of one over the other is but one mode of practicing the invention. In the compressed state, the diaphragm spring 46 takes a more planer shape and in some embodiments may form a point of inflection between the periphery 54 and the teeth 56.

In an embodiment of the present invention the first side 21 is annular, and the deflection elements 24 are substantially spherical. In a further embodiment, at least one of the deflection elements include a substantially cylindrical portion (see FIG. 18). In such a cylindrical embodiment it is contemplated that the substantially cylindrical deflection element 25 optionally might include rounded ends and a groove, to facilitate and guide the cylindrical embodiments travel up and down the ramp 34. The radially outermost position of cylindrical deflection element 25 is indicated at 19. The ramp would have a matching rail to engage the groove (not shown). The cross-section of a cylindrical embodiment in the direction of travel would be substantially circular, and the cross-section in the direction perpendicular to that of travel (or parallel to that of the plane of the ramp would be rectangular or more hourglass like, optionally with a rounded terminus. It is also contemplated that cylindrical elements may have more than one guide groove (not shown). If such an element is used it is contemplated that the pocket elements 23 would run in a direction which is perpendicular to a tangent to radially outer perimeter 16. In another embodiment at least one of the plurality of deflection elements is substantially spherical. With substantially spherical deflection elements, pocket elements 22 may run in a direction that is perpendicular to a tangent to perimeter 16 or may run at other than a right angle toward the tangent. In some embodiments the pocket elements 22 become shallower as they radially approach the perimeter so as to accomplish the desired diaphragm spring member deflection. It is contemplated that in one embodiment the radially innermost portions of the pocket elements 22 are at least as deep as the diameters of the elements 24. When the deflection elements 24 move towards the radially outer perimeter 16 they will protrude above the surface of the pressure plate member. Depending upon the configuration of the pocket elements different sizes and shapes of deflection elements may be accommodated in one assembly so long as they are arranged so that the assembly does not become unbalanced.

In one embodiment of the present invention, the pressure plate member 10 is made of a machinable metal. While virtually any metal with sufficient workability, strength and durability, may be used, aluminum alloys are preferred in this embodiment. The following alloys are contemplated for this embodiment, but other alloys and other metals are similarly satisfactory. Specific aluminum alloys contemplated include 2011, 2014, 2017, 2024, 3003, 5005, 5052, 5083, and 7075. Of the above 7075 is especially desirable for its superior mechanical, chemical, and physical properties. In general, when aluminum alloys are used, it is preferred that the surfaces of the pocket elements be hard anodized.

In another embodiment, first side 21 includes a protruding portion 28, which is substantially concentric with perimeter 16. The protruding portion 28 may further include a central aperture 30, which aperture may be threaded for the purpose of securing a clutch activation mechanism to pressure plate member 10. The protruding portion 28 is contemplated to include a hollow core, but need not. The protruding portion 28 may be affixed to the first side or may be formed of the same piece. However, in all cases where there is a protruding portion, the protrusion is sturdily affixed to first side 21.

A spring retainer element 48 serves to retain diaphragm spring member 44 in operative association with the other components of the clutch assembly. Spring retainer element 48 can take many forms, two of which are shown, for example, at 48 and 50, and may be customized in thickness depending on the needs of an application. It should be understood that reference to the heavier or lighter spring retainer element should not be read to exclude the utility of either retainer element, and description of one over the other is but one mode of practicing the invention. The spring retainer element 48 typically includes a plurality of apertures 68, 70, 72, and 74 wherein said apertures are configured to accommodate a plurality of fastener elements 38 projected axially therethrough. The spring retainer element 48 includes a contact portion 73, which contacts the diaphragm spring member 44 along a substantially circular contact line. The contact line is shown to be intersected by the plurality of apertures 68, 70, 72, and 74 so that the force exerted by fastener elements 38 on spring retainer element 48 is applied directly to the contact line.

The spring retainer element 48 is, for example, in the form of an annulus, and includes an internal periphery 66 and an external periphery 64. The spring retainer element 48 includes an upper surface 62, where upper distinguishes from lower but not relative position vis-à-vis up or down. Diaphragm spring member 46 is adapted to being confined by spring retainer element 48 in spring biasing association with pressure plate member 10. Radially outer periphery 54 of diaphragm spring member 44 is adapted to resiliently and biasingly engage first side 21 of pressure plate member 10 either directly or through the deflection elements. The spring force exerted by spring member 44 is exerted generally in an axial inward direction, which tends to force the clutch into an engaged configuration. As the RPMs increase, centrifugal force causes deflection elements 24 to engage the diaphragm spring member 44 adjacent its radially outer periphery 54. As the deflection elements 24 move radially outwardly along ramp portion 27 they deflect the diaphragm spring member 44 away from first surface 21 in an axially outward direction. See, for example, FIGS. 11, 13, 15, and 16. Contact portion 73 of spring retainer element 48 bears against diaphragm spring member 44 and holds the part of the member 44 that it contacts in a fixed axially spaced distance from first side 21. See, for example, distances A and B as shown in FIGS. 15 and 16, and compared in FIG. 17, and illustrated by space 13 in FIGS. 11 and 13. As shown in these FIGS., the bending in member 44 takes place radially outwardly of contact portion 73 between the portion 73 and the periphery 54.

When the deflection elements 24 are at their maximum radially outward position (see FIG. 16) it is possible to manually disengage the clutch by moving pressure plate member 10 axially outwardly towards contact portion 73. The distance between spring retainer element 48 and the member 10 decreases as shown at C in FIGS. 10 and 17, by an amount indicated at D. The deflection element 24 is carried by the member 10 towards the diaphragm spring member 44. This causes further deflection of the member 44 even though the deflection member does not move any further along ramp portion 27 relative to the member 10. Deflection element 24 is at its radially and axially outward limits before the pressure plate member begins to move axially. Preferably, this movement causes the diaphragm spring member 44 to substantially or almost flatten (for example, to an angle of less than approximately 5 degrees from horizontal measured between contact portion 73 and the region adjacent to periphery 54).

While not intending to be bound by any theory, it is now believed that the substantial flattening of the member 44 as illustrated, for example, in FIG. 10 reduces the force that is required to move the member 10 relative to contact portion 73. It is also now believed that the amount of spring tension exhibited by diaphragm spring member 44 peaks at about the configuration illustrated in FIG. 16, and decreases as the axial movement of pressure plate member 10 brings the member 10 and the spring retainer element 48 to the closer configuration shown, for example, in FIG. 10. This decrease in spring tension, it is believed, contributes significantly to facilitating the manual operation of the clutch assembly. The clutch may also be released at low RPM's when the deflection elements 24 are not at their radially and axially outer limits. The diaphragm spring member 44 should be selected so that its characteristics permit it to be manually released with the deflection elements 24 at all locations along ramp portion 27.

The weight of the deflection elements 24 can be adjusted depending on the effect desired. Heavier deflection elements 24 are capable of deforming a more rigid diaphragm spring member 44 as a function of RPM relative to lighter deflection elements. Lighter deflection elements would require higher RPMs for the same deformation. The angle 29 of ramp portions 27 also can play a role in the amount of deflection that the deflection elements may generate in a given operational mode. A steeper angle 29 will generally require higher RPMs for the same effect achievable with lower RPMs at smaller slope angles 29.

The length of ramp portion 27 may be varied depending on the embodiment from as little as approximately one hundredth of the diameter of deflection element 24 to two or more times such diameter. In some configurations longer ramp portions over approximately one half such diameter in length do not substantially improve the operation of the clutch assembly, although they may be used, if desired. In general, the ramp portion 27 will be designed to accommodate a deflection element 24 approximately at or below the level of first side 21 when in a radial inward first position and above the level of first side by at least approximately one thirty second to three quarters of the diameter of the deflection element 24 when in a second position indicated at 26. In any event, the limits of travel of the deflection elements 24 should be such as to allow the diaphragm spring member to flex from its normal at rest installed position to a substantially flat (approximately 5 degrees or less from horizontal) position when the clutch is released at a high RPM setting. Compare, for example, the relative spring deflection illustrated in FIGS. 10 and 15. The spring resistance of a diaphragm spring increases as the spring is compressed until the spring starts to go from concave in the axially inward direction to substantially flat, at which point the spring force drops substantially. If the spring periphery is pushed further until the spring goes past flat and starts to go concave in the axially outward direction, the spring force increases again. This spring behavior is reflected in the response of the clutch assembly to operator input. When the RPMs are raised to the point where the deflection elements engage and cause the clutch to lock up, the operator will experience a certain level of resistance to manually disengaging the clutch. As the RPMs increase, the resistance to disengagement increases until a point of maximum resistance is reached. Preferably, this will approximately correspond to the deflection elements reaching the radially outer limit of their travel up the ramp portion. At this point, further deflection of the spring causes the spring force to drop and it becomes very easy to move the pressure plate member axially for the thirty to fifty thousandths of an inch that is typically required to commence disengagement of the clutch. As soon as the rotation rate of the pressure plate member drops the deflection elements move radially inwardly and axially inwardly. This immediately relieves the spring tension. If the clutch assembly is adjusted so that the deflection elements deflect the spring past its peak tension position before the deflection elements reach the radially outer ends of the ramp portions, the clutch will likely slip as the deflection elements move to their radially outermost positions and take the spring past its position of peak strength. For a given clutch assembly, there is an RPM setting at which the clutch feels to the operator as if it has locked up. That is, there is no slippage in the clutch at that and higher RPMs. Increasing the weight of the deflection elements will generally decrease the RPM setting at which this lock-up occurs. Increasing the weight of the deflection elements will also generally increase the force that will need to be applied by the operator to release the clutch. Likewise, increasing the spring force that is inherent in the diaphragm spring member will also generally increase the force that will need to be applied by the operator to release the clutch.

At a bare minimum, a kit according to the present invention includes pressure plate member 10 and deflection elements 24. Every other part of the clutch assembly, except possibly the fastener elements 38 may be original equipment as originally made by the clutch manufacturer. Where additional improvements are desired, a specially made diaphragm spring member 44 or 46 may be used. Several such spring members may be used by stacking them one on another if it is desired to achieve a particular spring characteristic. Different weights or different numbers of deflection elements 24 may be provided to control the response of the clutch assembly to different RPMs, if desired.

A large number of pocket elements 22 may be provided, but not every pocket element has to be filled with a deflection element 24. The combined weight of the deflection elements in the clutch assembly may be adjusted by adding or removing deflection elements. The action of the clutch generally depends more on the combined weight of the deflection elements than it does on the weight of the individual elements, provided they are uniformly distributed around the member 10. The deflection elements do not have to all be of the same weight. Some may be made of a different material that has a different density. Care should be taken to see that the weight is evenly distributed about the pressure plate member so as to maintain balance and avoid vibration.

By providing excess pocket elements, the life of the assembly may be prolonged. If less than about half of the pocket elements are filled with deflection elements, the unfilled pocket elements are held in reserve. If one set of pocket elements becomes worn or damaged, moving the deflection elements to an unused set of equally spaced pocket elements easily and quickly effects repair of the system.

The weight of the deflection elements may be changed by increasing their size or composition, or both. For example, replacing steel elements with tungsten carbide elements of the same size will substantially increase the weight. If desired, the weight may be further increased by replacing the carbide elements with beryllium elements. The diameter of the deflection elements may range from as small as approximately one eighth of an inch to as much as approximately five eighths of an inch or more.

In an embodiment of the present invention the pressure plate member has a diameter of about five and eleven-sixteenth inches, a thickness of about one half inch where the pocket elements are located. A lip projects axially outwardly from the first side of the pressure plate member for approximately one eighth of an inch. The clutch side of the pressure plate member is recessed inwardly of the pocket elements to a thickness of approximately one eighth of an inch. The deflection elements are spherical steel balls with a diameter of about three eighths of an inch. The ramp portions are about fifteen thirty seconds of an inch long, which allows the steel balls to roll for approximately three thirty seconds of an inch. That is, the length of the ramp portion is approximately one quarter the length of the ball diameter. The ramp extends at an angle of about 30 degrees to the horizon. There are 32 pocket elements equally spaced in a radial array along a common circle that is concentric with and adjacent to the lip element. The pocket elements extend into the radially inner wall of the lip element for approximately five thousandths of an inch. The radially inner wall extends substantially parallel to and concentric with the axis of rotation of the pressure plate member. At the radially inner end of the ramp portion the tops of the steel balls are substantially even with the first side of the pressure plate member. The ramp portions extend radially of the pressure plate member. All 32 pocket elements were filled with steel balls. This clutch operated very satisfactorily with otherwise standard parts as the clutch was originally manufactured, except that different through bolts were used to hold the assembly together.

What has been shown and described are preferred embodiments in which changes and modifications may be made without departing from the spirit and scope of the accompanying claims.

What is claimed is:

1. An improved clutch component comprising:
a substantially circular element having a perimeter;
a substantially circular biasing element having a periphery, said periphery being substantially in a plane, said substantially circular biasing element being comprised of a resilient material that is capable of being elastically deformed in a direction substantially perpendicular to said plane;

a plurality of deflection elements having substantially circular cross-sections, wherein said substantially circular element includes a first side and a second side and a thickness therebetween and said first side is generally bounded by a lip element dimensioned to radially restrain said periphery;

said first side includes a plurality of pocket elements radially arrayed adjacent to said perimeter and each of said pocket elements is of sufficient width and depth to receive at least a part of a said deflection element therewithin, said first side further includes a protruding portion with a threaded central aperture projecting axially from said first side and generally concentrically with said lip element; and each of said pocket elements having a varying depth into said first side, wherein said depth is reduced with increasing proximity to the perimeter of said circular element.

2. The improved clutch component of claim 1 wherein said pocket elements generally extend at least to said lip element.

3. The improved clutch component of claim 1 wherein at least one of said deflection elements is substantially spherical.

4. The improved clutch component of claim 1 wherein at least one of deflection elements includes a substantially cylindrical portion.

5. The improved clutch component of claim 1 wherein said substantially circular element is made of a machinable metal.

6. The improved clutch component of claim 5 wherein the machinable metal is an aluminum alloy.

7. An improved clutch augmentation kit comprising:
a pressure plate member having a substantially circular planform, an axis of rotation, generally opposed first and second sides with a thickness therebetween, and a lip element extending axially outwardly and peripherially from said first side, said pressure plate member being adapted to cooperating with a diaphragm spring member that has a substantially circular periphery and is adapted to being radially confined by said lip element in biasing engagement with said first side;

a plurality of substantially spherical deflection elements;

a plurality of radially arrayed pocket elements formed in said first side generally adjacent said lip element, each of said pocket elements including a ramp portion extending generally radially and axially outwardly; and each of said pocket elements being adapted to captively receive a said spherical deflection element for movement along a length of said ramp portion between a radially inward first position nearer said axis of rotation and a radially outer second position, wherein movement of said spherical deflection elements radially outwardly along said ramp portion is adapted to resiliently deflect said substantially circular periphery axially outwardly from said first side.

8. The improved clutch augmentation kit of claim 7, wherein each of the radially arrayed pocket elements extends radially to said lip element, and said lip element includes a plurality of axially extending grooves, a said axially extending groove being aligned with each of said pocket elements.

9. The improved clutch augmentation kit of claim 7 wherein said spherical deflection elements protrude above said first side when located at said second position.

10. The improved clutch augmentation kit of claim 7 wherein said spherical deflection elements do not protrude above said first side when located at said first position.

11. The improved clutch augmentation kit of claim 7 wherein the pressure plate is made of a machinable metal.

12. The improved clutch augmentation kit of claim 7 wherein the length of said ramp portion is equal to from approximately one sixteenth to one half the diameter of said spherical deflection element.

13. A clutch spring kit comprising:
a pressure plate member adapted for rotation generally about a longitudinal axis in a plane, said pressure plate member having generally opposed spring and clutch sides, and including a lip element adapted to radially confining at least one diaphragm spring member on said spring side;

a plurality of pocket elements generally arranged in an annular array formed in said pressure plate member and generally disposed adjacent said lip element, said pocket elements opening on said spring side and including ramp portions, said ramp portions extending within said pockets generally outwardly toward said lip element and angularly upwardly towards said spring side;

a plurality of spherical elements, said spherical elements being adapted to being received in said pockets for movement along said ramp portions; and at least one said diaphragm spring member having a periphery and adapted to being confined by said lip element in spring biasing association with said pressure plate member, said diaphragm spring member being adapted to resiliently biasing said pressure plate member generally in an axial direction that said clutch side faces, said spherical deflection elements being adapted to engage said diaphragm spring member adjacent said periphery and to deflect said diaphragm spring member as said spherical elements move upwardly and outwardly along said ramp portions.

* * * * *